Sept. 9, 1947.     R. G. JEWELL     2,427,213
LINEAR MOTION TRANSMITTER OR RECEIVER
Filed Oct. 12, 1945     2 Sheets-Sheet 1

Inventor:
Richard G. Jewell,
by Prandel & Mack
His Attorney.

Sept. 9, 1947.   R. G. JEWELL   2,427,213
LINEAR MOTION TRANSMITTER OR RECEIVER
Filed Oct. 12, 1945   2 Sheets-Sheet 2
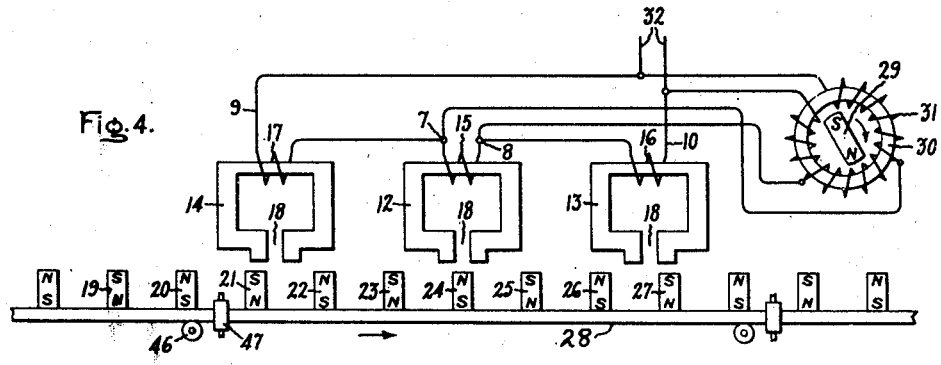
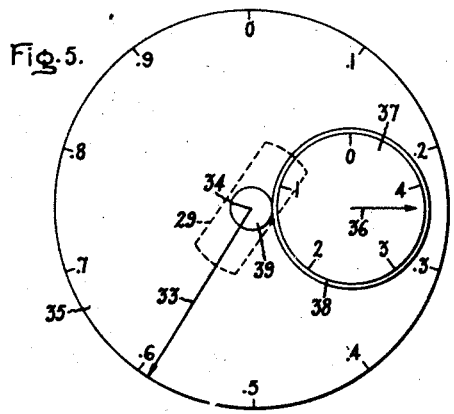
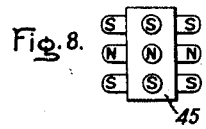
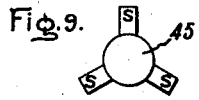
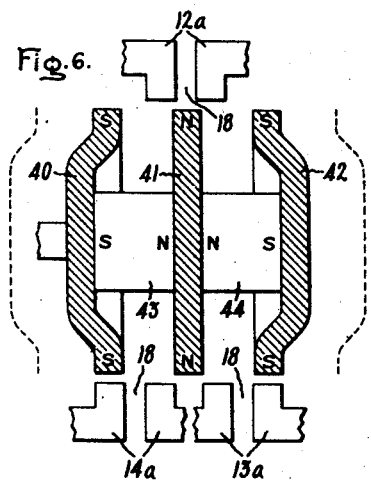
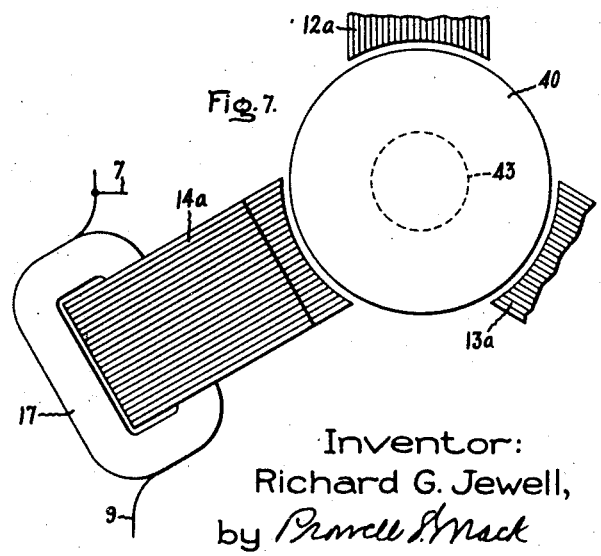
Inventor:
Richard G. Jewell,
by *Prowell P. Mack*
His Attorney.

Patented Sept. 9, 1947

2,427,213

UNITED STATES PATENT OFFICE 2,427,213

LINEAR MOTION TRANSMITTER OR RECEIVER

Richard G. Jewell, Swampscott, Mass., assignor to General Electric Company, a corporation of New York Application October 12, 1945, Serial No. 622,055

6 Claims. (Cl. 177—351)

My invention relates to a linear motion transmitter or receiver operating on the saturation core or second harmonic principle.

Figure 1:
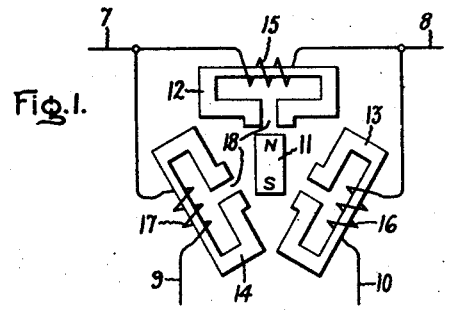

In United States Letters Patent No. 2,342,637 there is described telemetering apparatus employing rotary motion in transmitter and receiver operating on the saturation core principle. In many applications such as, for example, in pressure measurement, the straight line motion of the pressure bellows must be converted to rotation as shown in Fig. 1 of the above-mentioned patent before the rotary motion transmitter can be used. If the transmitter is to be mounted directly on an engine or other apparatus subject to vibration without shockproof mounting, the use of linkage or gears for changing from linear to rotary motion is not practicable because of the vibration. In this and other cases it is desirable to have a transmitter in which the straight line motion can be directly converted to electrical variations which will operate a rotary type receiver of the character represented in the above-mentioned patent. The present invention relates to such a straight line motion apparatus.

Figure 2:
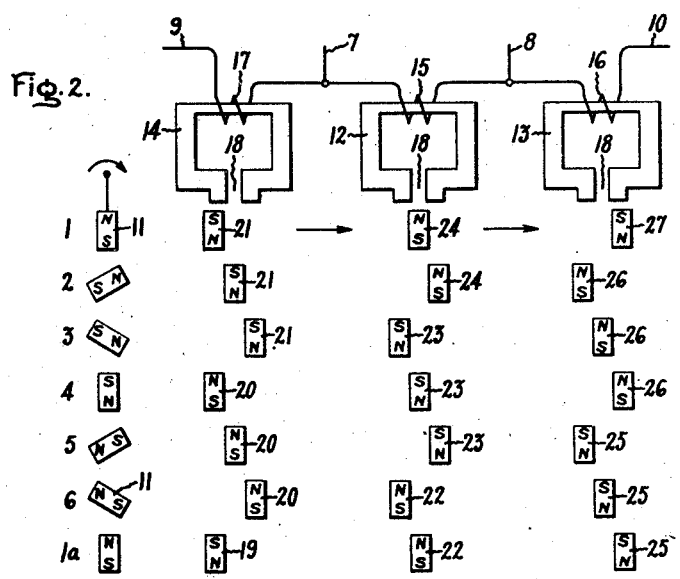
Figure 3:
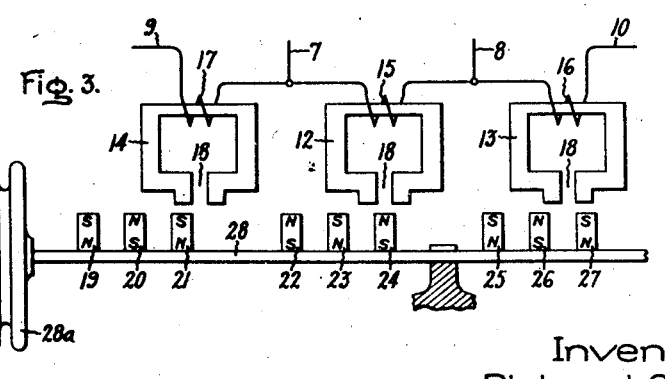

The features of my invention which are believed to be novel and patentable will be pointed out in the claims appended hereto. For a better understanding of my invention, reference is made in the following description to the accompanying drawings in which Figs. 1 and 2 are diagrammatic apparatus representations to assist in an understanding of the changes that are made in arriving at a linear or straight line motion transmitter electrically equivalent to a rotary transmitter operating on the saturation core principle. Fig. 3 shows one embodiment of my invention for limited motion use. Fig. 4 shows another embodiment of my invention illustrating the manner of designing the linear motion transmitter for unlimited motion. Fig. 5 illustrates a form of multiple pointer dial that may be used on a receiver of an unlimited motion telemetering system embodying my invention. Figs. 6 and 7 are sectional side and end views of a compact form of linear motion transmitter, Fig. 6 being somewhat schematic. Figs. 8 and 9 are plan and end views of another form of permanent magnet movable element that may be used in a transmitter such as shown in Fig. 7.

In Fig. 1, I have represented another possible way of building a rotary motion transmitter of the saturated core type equivalent to that shown in Fig. 1 of the previously mentioned patent where 7, 8, 9, and 10 correspond to the terminals of like number in such patent, 9 and 10 being connected to a source of alternating current supply. A permanent magnet bar rotor 11 is essentially equivalent to the circular permanent rotor of such patent. The core instead of being in one annular piece is divided into three C-shaped cores 12, 13, and 14 having coils 15, 16, and 17 on reduced size saturable sections of the cores and with gaps 18 therein facing inward toward the rotor. As rotor 11 is turned, and with alternating current excitation applied to terminals 9 and 10, the magnet flux linking the three coils goes through the same sequence for each of the windings as in the toroid form of transmitter stator of the previously mentioned patent; and the pole shapes, gaps, etc. can be made such as to give the same effective flux for corresponding rotor positions so that the transmitter of Fig. 2 can be substituted for the transmitter of the patent and produce like results.

In Fig. 2 the cores 12, 13, and 14 of Fig. 1 are arranged in a straight row and the similar coils and terminal arrangements therefor are indicated by like reference characters. At the left in Fig. 2, I have represented the rotor magnet 11 of Fig. 1 in six different rotary positions designated 1 to 6 and arranged in a vertical column to serve as a key to corresponding positions in Fig. 1 for the purpose of comparing such rotor positions with the corresponding locations of similar bar magnets moved linearly and at right angles past the gaps 18 in the straight line of cores 12, 13, and 14 of Fig. 2. It is assumed that in Fig. 2 there are three bar magnets such as the magnets 19, 20, and 21 of Fig. 3 cooperating with each of the three cores. However, only the effective magnet for each of the several positions is represented in Fig. 2. Six effective positions of the magnets such as 19, 20, and 21 adjacent their corresponding core in Fig. 2 are indicated in columns opposite the column for the rotor magnet 11 in a manner to form a comparison table.

Referring to line 1 of the table of Fig. 2 corresponding to the rotor position 1 for the rotor 11 of Fig. 1, which is the position shown in Fig. 1 where the N. pole of rotor 11 is centrally positioned opposite the nonmagnetic gap in core 12, in such position the magnet will produce no resultant flux in either direction through the core section 12 on which coil 15 is located. This corresponds to the position and polarity of magnet 24 opposite core 12 in Fig. 2. In Fig. 1 cores 13 and 14 carry equal amounts of flux from magnet 11 with its south pole most nearly adjacent such cores. In Fig. 2 this corresponds to the position of magnet 21 with its south pole opposite the left pole of core 14 and to the position of magnet 27 with its south pole opposite the right pole of core 13. Hence, for this position of line 1, Fig. 2, of the various magnets in Figs. 1 and 2, similar saturation and electrical effects will be produced in the cores and coils of the two forms of devices.

In line 2 of the table, Fig. 2, rotor 11 has rotated 60 degrees clockwise, which will bring the south pole rotor magnet 11 centrally of the gap in core 14, Fig. 1. This corresponds to a linear movement of the magnets 21, 24, and 27 a corresponding amount to the right in Fig. 2. The magnet 27 of core 13 is no longer effective but another magnet 26 has been moved into effective position with respect to core 13. The south pole of magnet 21 is centrally opposite the gap in core 14 and corresponds to the rotor position of the south pole of rotor 11, while magnets 24 and 26 opposite cores 12 and 13 correspond to the north pole position of rotor 11 in Fig. 1.

In line 3 of the table rotor 11 has rotated another 60 degrees clockwise and the magnets 21, 24, and 26 have been moved a corresponding amount to the right. Magnet 24 opposite core 12 is no longer effective but another magnet 23 has been moved into effective position with respect to core 12. The saturation and electrical effects in the telemetering circuit are the same in Figs. 1 and 2 for the line 3 positions of the various parts. Similarly, lines 4, 5, and 6 of the table, Fig. 2, correspond to additional progressive 60-degree rotations of rotor 11 and corresponding progressive movements to the right of the magnets cooperating with the linear line of cores 14, 12, and 13 of Fig. 2, and the complete rotation of rotor 11 and corresponding magnet positions are shown in the bottom line of the table which has been numbered 1a and is the electrical equivalent of line 1 of the table. There are of course an innumerable number of other intermediate corresponding positions for the rotary and linear forms of devices with corresponding saturation and electrical effects, but it is believed that the table of Fig. 2 will suffice to show that the two arrangements are or can be made exactly equivalent with respect to the electrical signals which are transmitted.

If the linear movable magnets 19 to 27, inclusive, are mounted on a common movable support 28 so as to be moved linearly past the cores 12, 13, and 14 by or in response to a pressure measuring bellows 28a or other linear measurement, we arrive at the construction and apparatus represented in Fig. 3. This apparatus is shown in a position corresponding to line 1 of the table of Fig. 2, and progressive movement thereof to the right the distance of the spacing of magnets 19 and 21 includes the different operation steps pictured in such table and corresponds to one complete rotation of rotor 11 of Fig. 1.

The complete connection of the linear type of transmitter to the source of supply and receiver is shown in Fig. 4. The connection to the receiver is in three phase fashion and to the source of supply in series single phase fashion. Fig. 4 represents a further modification in the arrangement of the movable magnets of the linear transmitter. The uniform spacing between the magnets for the individual cores is made equal to the spacing between the magnet groups for the different cores but less than the uniform spacing between cores so that by providing an unlimited number of such magnets, one group such as magnets 19, 20, and 21 may be progressively moved past all three cores 12, 13, and 14 without any interruption or irregularity in the nature of the signals transmitter just as in the rotary form of transmitter the rotor may rotate continuously in either direction to transmit more than a complete rotary movement. Extra magnets are shown in Fig. 4 on either side of the magnets 19—27 to indicate that this magnet system may be extended to any limit desired. It is to be noted that an alternate polarity arrangement of the magnets is required in the groups as well as between the groups so that in Fig. 4 there is no "three group" significance and any magnet except those at the extremities may be used with any core.

The receiver used is essentially the same as that of the previously mentioned patent and comprises a polarized rotor 29, an annular saturably magnetic core 30, with a toroid winding 31 thereon having three equally spaced terminals connected to the source of alternating current supply 32 and to terminals 7, 8, 9, and 10 of the transmitter as shown. The rotor position, polarity and direction of rotation indicated for the receiver in Fig. 4 are correct for the position, polarity and direction of linear movement indicated for the transmitter. The arrangement will preferably be such that uniform angular motion in the receiver results from correspondingly equal linear displacements in the receiver. However, this can be modified by shaping of the pole pieces in the stator cores and their unequal spacing, or by an unequal spacing of the transmitter magnets. For example, if in Fig. 3, we provide additional groups of three magnets on support 28 spaced as there indicated, it is obvious that the receiver would have progressive rotary movement but with an irregularity therein once per revolution. In Fig. 4 the rotor of the receiver will make one revolution for a two-magnet pole spacing linear movement in the transmitter.

Where, as in Fig. 4, the apparatus has a range of more than one revolution in the receiver, the position of the transmitter may nevertheless be correctly and exactly indicated by providing the receiver with a pointer 33 (Fig. 5.) on its shaft 34 cooperating with a graduated scale 35 and a pointer 36 cooperating with a scale 37 and geared to shaft 34 through appropriate reduction gearing 38—39. With a 5-to-1 reduction gearing the pointer 33 makes five revolutions for one revolution of pointer 36. In Fig. 5 the transmitter position is indicated as 3.59 and may represent pressure or some other measured quantity to which the linear transmitter responds.

The linear transmitter will generally be made in more compact form such, for example, as indicated in Figs. 6 and 7, where the movable magnet poles are in the form of circular disks 40, 41, and 42 polarized by axial permanent magnets 43 and 44, and the stationary cores 12a, 13a, and 14a are grouped in circular formation as shown in Fig. 7 and are linearly displaced adjacent the periphery of the circular pole pieces as indicated in Fig. 6.

The representation of the stator pole pieces 13a and 14a, Fig. 6, is somewhat schematic as if they were both diametrically opposite pole piece 12a, but are shown this way in Fig. 6 to more clearly indicate the linear displacement relation. Cores 12a, 13a, and 14a in Figs. 6 and 7 correspond in function and in linear displacement relation to the cores 12, 13, and 14 of Fig. 2 and using Fig. 2 as a guide, it is evident that the position of the magnet pole pieces 40, 41, and 42 relative to the stator pole pieces corresponds to position line 1 of the table in Fig. 2 and that movement of the permanent magnet pole piece assembly of Fig. 6 to the right one-third the spacing between the pole pieces 40 and 41 will correspond to position line 2 of the table of Fig. 2. Movement of the pole piece asembly another one-third of its pole spacing will correspond to position line 3 of the Fig. 2 table. This corresponds to 120 degrees rotation of the receiver clockwise. The movable pole piece assembly of Fig. 6 can also be moved to the left from the position shown by a like amount with all stator cores active as previously explained, so that this transmitter is good for a 240-degree rotation range in the receiver and corresponds to a linear movement in the transmitter of Fig. 6 between the limits indicated by extreme dotted line positions of the permanent magnet pole piece assembly. By such an arrangement only one permanent magnet pole piece per stator core element is required, since it is evident that the circular pole pieces such as 40, 41, etc., can and do at times cooperate with two stator pole pieces simultaneously. Here the spacing of the core gaps is less than the spacing of the movable magnets. Thus when 40 is opposite the left pole piece of core 12a, it is also opposite the right pole piece of core 14a. The range of this form of transmitter can of course be extended by the addition of more permanent magnet and disk pole piece units. Shaping of the pole pieces of the cores 14a, etc., to conform to the circular shape of the pole pieces 40, etc., as shown in Fig. 7 improves the efficiency.

Another form of linearly movable permanent magnet pole piece assembly is represented in Figs. 8 and 9, the permanent magnets indicated being secured to a common support 45 of magnetic material. The stator cores may be assembled about this form of armature as in Fig. 7.

The linear motion to rotary motion system described is reversible in action. Thus in Fig. 4 rotary movement of the rotor 29 will cause linear movement of the armature 28 if the latter is made easily movable by being supported in place by rollers such as indicated at 46 and 47. Where such use is contemplated, the rotary transmitter should be more liberally designed than when used as a receiver. More than one receiver may be energized from the same transmitter, and the expedients applicable to the saturation core type of telemetering apparatus are generally applicable to my invention.

In accordance with the provisions of the patent statutes I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. An electromagnetic device adapted for use as a telemetering transmitter or receiver, said device comprising a plurality of saturable magnetic core members each provided with a winding, connections adapted to connect said windings together, to a telemetering system and to an excitation source of periodically varying current, said core members each having nonmagnetic gap defining pole pieces, a member which is movable relative to said core members, said member having a plurality of magnetic polar projections thereon spaced apart in the direction of such movement and alternately polarized with unidirectional flux polarization, said saturable core members being spaced apart along the path of such movement with their pole pieces magnetically exposed to said polarized polar projections such that the core members are progressively subject to saturation fluxes from said alternately polarized pole pieces, when there is relative movement in a given direction.

2. An electromagnetic device adapted for use as a telemetering transmitter or receiver, said device comprising a plurality of stationary saturable magnetic core members each provided with a winding, connections adapted to connect said windings together, to a telemetering system and for excitation from a source of alternating current, each of said core members having nonmagnetic gap defining spaced apart pole pieces, a movable member subject to linear movement and provided with a plurality of polarized magnetic projections spaced apart along the line of such linear movement and with alternate projections reversely polarized, said saturable core members being spaced apart along such line with their pole pieces adjacent the line of movement of the polarized magnetic projections of said movable member, such that said core members are progressively subject to saturation fluxes from the polarized projections of alternate polarity upon movement of the movable member in either direction.

3. In a telemetering system of the saturation magnetic core type, a saturation core transmitter having stationary and movable members in which the direction of relative movement is linear, the stationary member having a plurality of saturable magnetic cores spaced apart along the line of such linear movement, each core provided with a winding and with a nonmagnetic gap, connections adapted to connect said windings in an alternating current excitation circuit and in a telemetering circuit, the movable member having a plurality of magnetic pole pieces spaced apart in the direction of such linear movement and polarized alternately with unidirectional flux polarization, said members being so related that upon relative movement in a given direction, alternately polarized pole pieces of the movable member move adjacent to and in crosswise relation to the gap in the stationary cores and cause said cores to be progressively subjected to saturation fluxes from the alternately polarized pole pieces.

4. A saturation core electromagnetic device adapted for use as a transmitter or receiver, said device having three stationary C-shaped magnetic saturable cores with windings thereon, connections adapted to connect said windings in three-phase fashion to a telemetering system and in series single-phase fashion to a source of alternating current supply, a member having a central supporting axis, said member being movable in the direction of such axis and magnetically polarized parts extending radially therefrom and axially spaced along said member, the spaced parts being alternately polarized as north and south magnetic poles, said cores being disposed in circular formation about said member but spaced apart in the direction of its movement with the nonmagnetic gaps in said cores positioned adjacent to and at right angles to the path of movement of the polarized parts such that upon movement of the alternately polarized parts past the core gaps the direction and extent of saturation of said cores are progressively modified.

5. A telemetering device comprising three C-shaped saturable magnetic cores with windings thereon, connections for connecting said windings in three-phase fashion to a telemetering system and in single-phase series fashion to a source of alternating current supply, a member movable in a linear direction having a plurality of magnetic pole pieces thereon uniformly spaced in the direction of linear movement and with the spaced pole pieces alternately polarized, said cores being also uniformly spaced in the direction of such linear movement but with a different spacing than said polarized pole pieces, said core parts being positioned with their nonmagnetic gaps adjacent and at right angles to the path of movement of the polarized pole pieces such that the saturable conditions of the three cores are progressively modified in rotation as the movable member is moved in a given direction.

6. A telemetering device of the saturation core type having parts which are relatively movable in a linear direction, one part comprising three C-shaped saturable magnetic cores with windings thereon and having connections for connecting the windings in three-phase fashion to a telemetering system and in series to a source of alternating current excitation, the other member comprising a plurality of magnetic pole pieces supported in uniform spaced relation in the direction of linear movement with alternately spaced poles of opposite magnetic polarity, the three cores being spaced ⅔ the spacing of the magnetic pole pieces in the direction of linear movement with their nonmagnetic gaps adjacent to and at right angles to the path of movement of the pole pieces such that the conditions of saturation in said cores are modified in predetermined progressive relation as the pole pieces are moved past such gaps.

RICHARD G. JEWELL.

REFERENCES CITED

The following references are of record in the file of this patent:

UNITED STATES PATENTS

| Number | Name | Date |
|---|---|---|
| 2,342,637 | Bechberger | Feb. 29, 1944 |
| 2,197,636 | Faus | Apr. 16, 1940 |
| 2,013,106 | Nagel | Aug. 31, 1897 |

FOREIGN PATENTS

| Number | Country | Date |
|---|---|---|
| 93,912 | Germany | Aug. 31, 1897 |
| 338,104 | Germany | June 11, 1921 |
| 205,573 | Germany | Jan. 5, 1909 |